(12) United States Patent
Engberg et al.

(10) Patent No.: US 6,229,942 B1
(45) Date of Patent: May 8, 2001

(54) FLEXFOILS HAVING CONNECTOR TABS

(75) Inventors: Kristian Engberg, Sollentuna; Hjalmar Hesselbom, Huddinge; Mats Robertsson, Stockholm, all of (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/024,223

(22) Filed: Feb. 17, 1998

(30) Foreign Application Priority Data

Feb. 18, 1997 (SE) ................................................ 9700574

(51) Int. Cl.⁷ ........................................................ G02B 6/42
(52) U.S. Cl. .............................. 385/39; 385/89; 385/76; 385/14
(58) Field of Search ................................ 385/39, 76, 89, 385/14

(56) References Cited

U.S. PATENT DOCUMENTS

| | | | |
|---|---|---|---|
| 3,777,154 | * 12/1973 | Lindsey | 250/227.11 |
| 5,204,925 | 4/1993 | Bonanni et al. | 385/89 |
| 5,259,051 | 11/1993 | Burack et al. | 385/76 |

FOREIGN PATENT DOCUMENTS 24 27 150   6/1974   (DE).

* cited by examiner

Primary Examiner—Rodney Bovernick
Assistant Examiner—Ellen E. Kim
(74) Attorney, Agent, or Firm—Burns, Doane, Swecker & Mathis, L.L.P.

(57) ABSTRACT

Ends of optical fibers in an optical flexfoil can be located at inner and edge positions of the flexfoil. Cut-outs are formed around such fiber ends to form tabs, which can be bent laterally from the plane of the flexfoil, so that the ends of the fibers are located at the exterior edges of the tabs. This allows a connection of the optical fibers to external devices in different directions such as a connection in a direction perpendicular to the flexfoil. The flexfoil can be used as an optical supplement to an electrical backplane, the tabs extending through openings in the backplane. Also, an easy handling of the flexfoil is achieved, since no connection tabs extending beyond the edges of the flexfoil are required. This is advantageous for example in polishing the ends of the fibers at the tab ends.

8 Claims, 4 Drawing Sheets

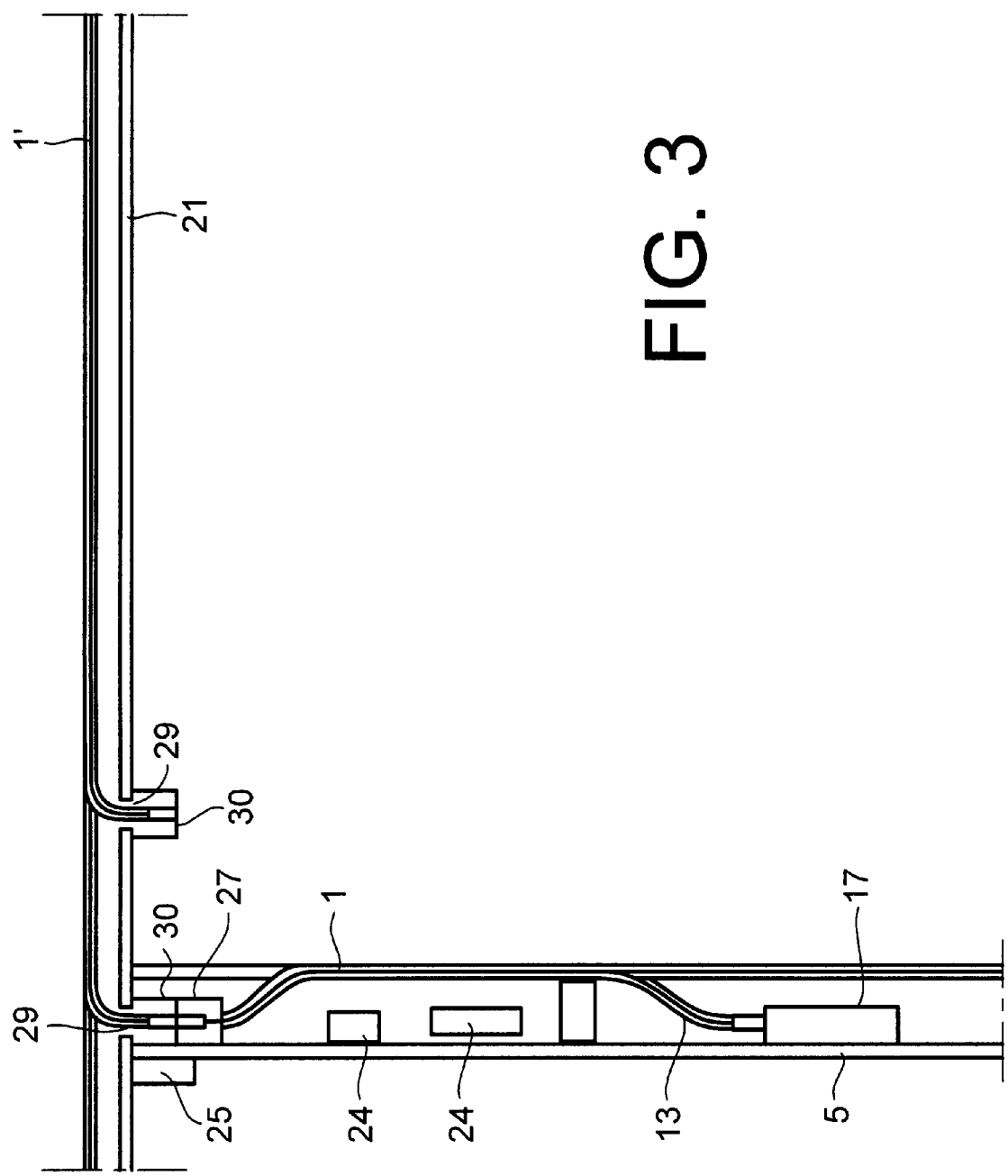

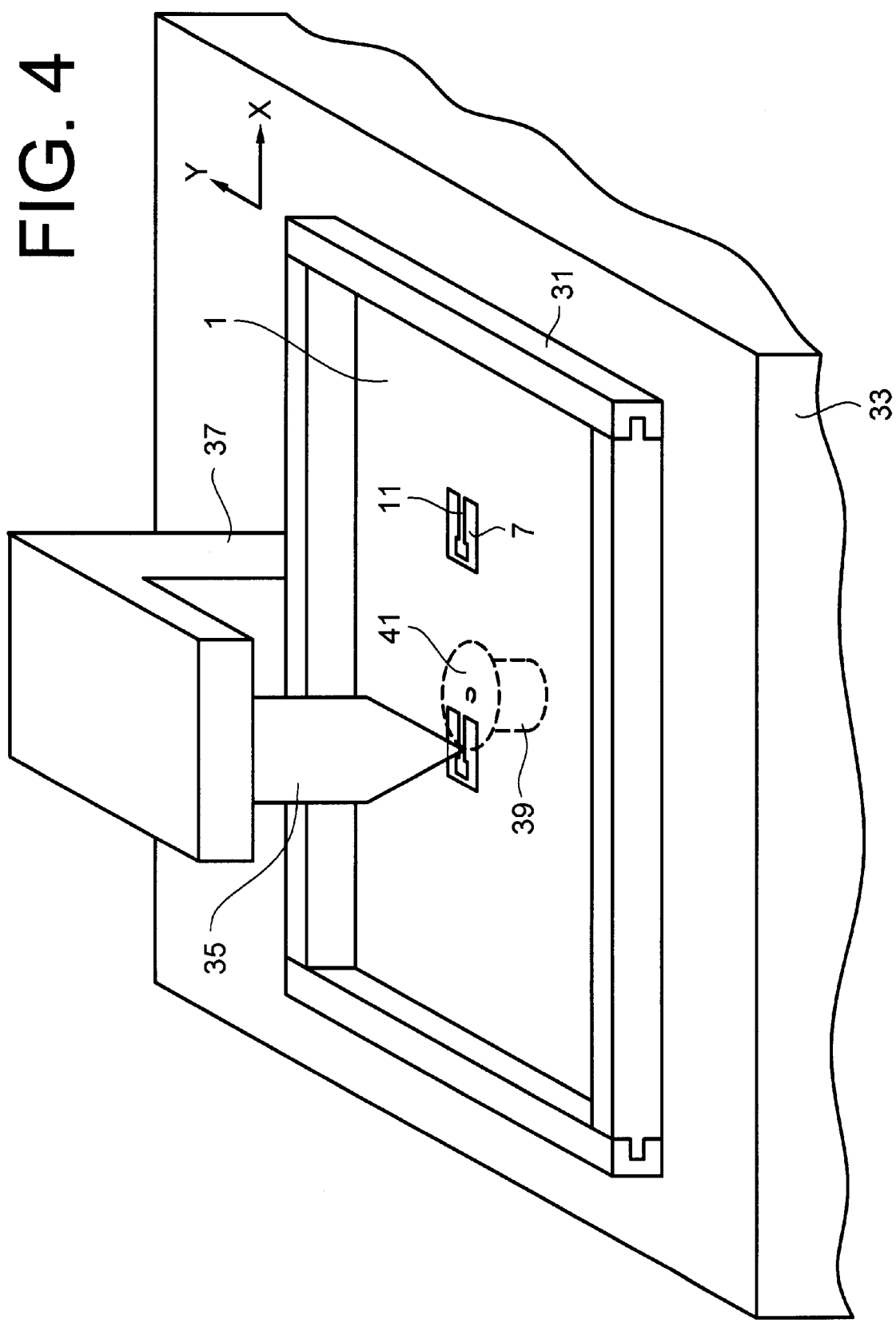

FLEXFOILS HAVING CONNECTOR TABS

This application claims priority under 35 U.S.C. §§119 and/or 365 to SW 9700574-8 filed in Sweden on Feb. 18, 1997; the entire content of which is hereby incorporated by reference.

The invention relates to optical connector means for flexfoils, i.e. flexible sheets having optical waveguides arranged therein or thereon, the connector means being intended for e.g. connection to circuit boards and to backplanes.

BACKGROUND

As the data rates of computers, telecommunication, etc. arm ever increasing, optical communication, well established since long times in long distance broad band communications, is also being introduced for short range applications inside exchanges and computers, etc. For such applications the number of optical interconnections may become significant. Thus there exist a need for controlling and handling the routing of optical fibers or generally optical wave guides.

One practical approach to his is to use a separate optical level to house all the optical connections in the shape of an optical flexfoil having internal fibers or waveguides. By using optical connectors at the ends of the fibers/waveguides connections can be established to electro-optical devices and to external devices such as electrical backplanes.

The company AT&T has in a few patents, in particular in U.S. Pat. No. 5,204,925 for Bonnani et al., described the use of optical fiber flexfoils having tabs extending from the man body of the flexfoils and being capable of being twisted in a 90° angle in relation to the main body in order to accomplish an "edge to edge" backplane connection where the edges of the main bodies of the circuit boards and the main bodies of the backplane flexfoils are located perpendicularly to each other. For general systems this is an unusual configuration as compared to the more familiar one where the circuit boards extend perpendicularly from the backplane. However, such a solution could possibly be accomplished in the AT&T solution by folding the flexfoil.

However, the AT&T concept has one severe limitation in that it is not possible to accomplish a connection of an edge of a circuit board at several distinct positions to the backplane using the simple geometrical solution disclosed. By having further prolonged tabs which both can be both twisted and bent, such connections would in principle be possible but the edge length of the backplane foil from which the tabs extend would be much larger than the otherwise required separation between or spacing of the boards, this effect being even more pronounced in the case where more tabs are required per circuit board.

In U.S. Pat. No. 5,259,051 for Burack et al., also assigned to AT&T, a method of making an optical flexfoil is disclosed. In the embodiment described in conjunction with FIG. 7, a base foil is used having tabs extending from a main body of the foil. On this foil one or more optical fibers are routed and then cut and thereupon possibly, a top foil can be applied. Finally the tab edges and the border are cut.

SUMMARY

It is an object of the invention to provide connector means for optical waveguides on flexfoils allowing a compact configuration of the flexfoils and also allowing a flexible layout of backplanes and circuit boards, with which the flexfoils are to be used.

It is a fiber object of the invention to provide a flexfoil having arrangements for allowing that connector tabs are polished in a simple apparatus.

Thus, the problem to be solved by the invention is how to make a flexfoil that can easily be handled, that allows external connections at any place of the flexfoil and that allows that a polishing of waveguide ends at connector tabs is made in a simple manner.

In an optical flexfoil comprising optical waveguides such as optical fibers ends of the optical fibers can be located at both inner and edge positions of the flexfoil. Cut-outs are formed around such fiber ends to form tabs so that the ends of the fibers are located at the exterior edges of the tabs. The tabs are made so that they can be bent from the plane of the main body of the flexfoil and thus to project from his plane. The tabs are then located at basically internal positions of the flexfoil, i.e. so that no portions of the tabs extend beyond the edges of the flexfoil in the plane thereof. In polishing the ends of the fibers at the tab edges hem tabs are bent to have their exterior regions located e.g. perpendicularly to the plane of the flexfoil and are rigidly retained in this position during the polishing is operation. Before the polishing operation the tab ends can have been provided with suitable optical connectors.

Thus, such tabs cut out from the body of the flexfoil can be used e.g. both as a means of connecting to electro-optical devices on a circuit board located immediately at one of the large surfaces of the flexfoil body and as a means of obtaining a 90° deflection from a flexfoil acting as an optical backplane oriented in parallel to a conventional electrical backplane and located at the rear side thereof. With this type of topology it is then possible to obtain multiple optical connection points between the backplane and a circuit board, not requiring additional edge length of the backplane flexfoil for obtaining a plurality of tabs per board. By making openings in the electrical backplane through which tabs bent out of the optical backplane extend it is then possible to obtain a mixture of electrical and optical connection sites at the board edge. By his topology also, optical connectors at the tab ends of e.g. multichannel type will be oriented in parallel to the circuit board plane without requiring any twist of the tabs.

As a cut out tab necessarily removes surface from the flexfoil, where waveguides otherwise could be located, it is required that the tabs are not unnecessarily long and thus that they can be bent in a small radius out of the flexfoil main plane. For an optical backplane this is also required for obtaining a reasonable spacing of the printed circuit boards which are to be connected to the backplane. It is also required that the fibers routed in the flexfoil can be routed at small routing radii around the cut-outs made for the tabs since otherwise large routing radii will even more decrease the number of fibers which can be routed in the flexfoil. This can be achieved by a suitable production method of the flexfoil. For optical fiber flexfoils proper fiber routing and lamination techniques make this possible without raising any reliability issues, see the simultaneously filed U.S. patent applications "Applying an optical fiber to a substrate" and "Lamination of optical fiber flexfoils". Instead of having fibers laminated in flexfoils, flexfoils having patterned polymer waveguides can be used.

For the board application tabs obtained from cut-outs and not projecting beyond the flexfoils edges are not required as such but may constitute an advantage for both routability and manufacturability. The manufacturing advantage is also true for the back plane case.

For routing there is more undisturbed flexfoil routable area left in the case where the tabs are external, i.e. projecting from the flexfoil edges, compared to the case of having a flexfoil comprising a plurality of strictly internal tabs being mounted in parallel to, at the large surface of a conventional circuit pattern board. However, the total routing area may be significantly smaller in the first case since per definition external tabs implies that the usually rectangular flexfoil will have to be smaller than the electric board, but for tabs having arbitrary locations the flexfoil can have the same size as the circuit board. Also, the arbitrary tab locations allow that corresponding optical connectors of the circuit board can be located with less restrictions since they must not then be located at the board edges. However, the importance of this may be limited to particular cases.

For internal tabs in fiber floxfoils to be practical, a fiber layout scheme which is not continuous—a continuous depositing process is described in the cited AT&T patent—but which can cut the fiber and restart at several positions is a definite advantage, since else there will be a plentitude of redundant loose fiber strands deposited on the flexfoil. However, this could possibly be acceptable provided that the flexfoil lamination process does not incur much loss at the locations where fibers cross each other. Such apparatus not requiring that a continuous fiber is used in the fiber deposition process is described in the cited, simultaneously filed U.S. patent application "Applying an optical fiber to a substrate". For flexfoils comprising polymer, e.g. thin-film type, waveguides this is not an issue.

For manufacturing, a flexfoil having tabs extending from its edges is not an object that can be easily handled as to what regards e.g. polishing of connectors. For such an operation the flexfoil can be easily mounted in a simple rectangular frame and a tab can be bent by movable retainer means from the plane of the main body of the flexfoil to have its end region located in a predetermined angle, for example perpendicularly, to said plane. Then the end surface of the waveguide or waveguides ending at the end of the bent tab are polished and the bent tab is allowed to relax to its original position in the plane of the main body of the flexfoil. Generally, before the polishing operation, an optical connector such as an MT-connector can be attached to the end of the tab.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of he above and other features thereof may be gained from and the invention will be better appreciated from a consideration of the following detailed description of non-limiting embodiments presented hereinbelow with reference to the accompanying drawings, in which:

FIG. 3 is schematic cross-sectional view of the assembly of FIG. 2 having also an optical flexfoil in front of a circuit board, and FIG. 4 is a schematic perspective view of apparatus for polishing ends of fibers in a connector of a flexfoil.

DETAILED DESCRIPTION

Figure 1:
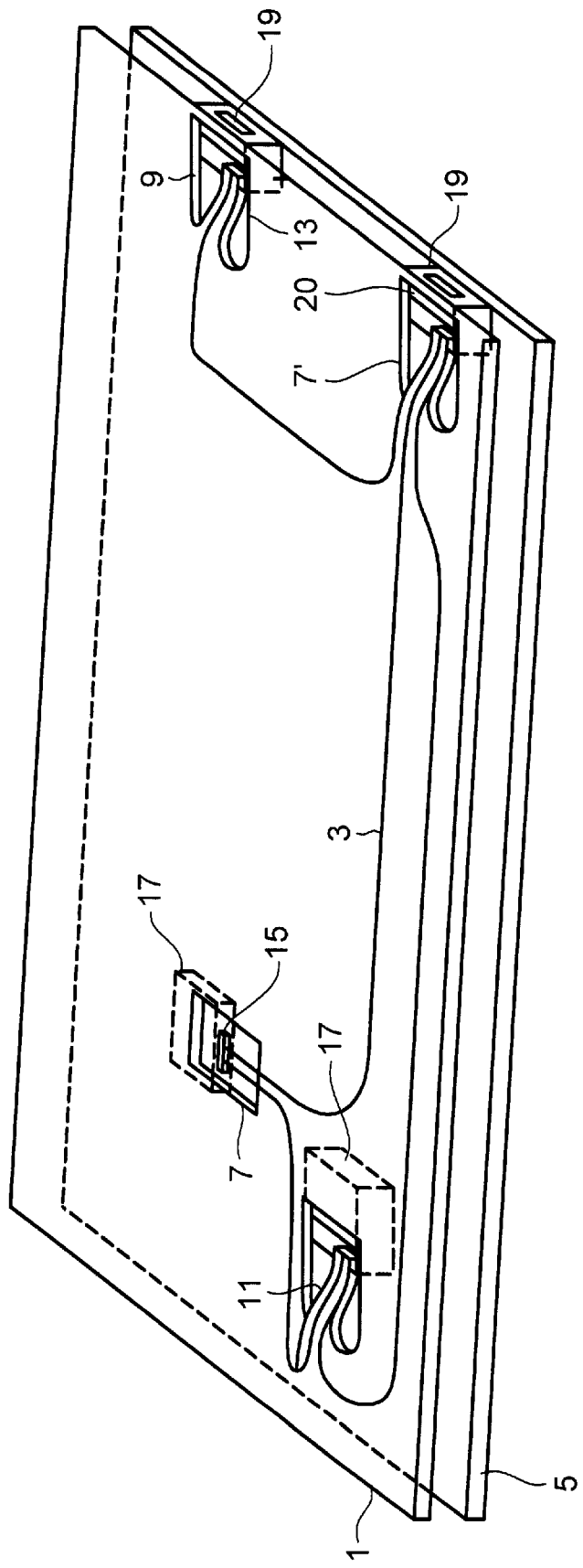
FIG. 1 is a schematic perspective view of a circuit board having an optical flexfoil applied thereon.

In FIG. 1 a flexfoil 1 is illustrated comprising optical waveguides, in the preferred embodiment optical fiber pieces 3 attached along accurately defined paths between two identical flexible plastics sheets which are laminated to each other to form a rectangular flexible, composite structure. The flexfoil 1 is placed on top of and in parallel to a printed circuit board 5, at one of the large surfaces thereof, having the same rectangular shape as the flexfoil 1 but generally being a little smaller. Cut-outs 7, 9 are made in the flexfoil 1 to form internal tabs 11 and edge tabs 13 and the places of the tabs 11 and 13 are chosen, so that ends of optical fibers pieces 3 are located at the ends or outermost edges of the tabs 7, 9. The cut-outs or rough-holes 7 can have a general U-shape in the case where they are made at inner locations of the flexfoil 1 to form internal tabs 11 and they are made as two parallel cut-out elongated areas 9 for making tabs 13 at an edge of flexfoil, the outermost or end portion of such an edge tab 13 being a portion of an edge of the flexfoil 1.

The tabs or tongues 11, 13 have substantially rectangular shapes, the long sides of which are parallel to the optical fibers located in the tabs which are to be connected to some device. The outermost short side is the end or outermost edge of the tab, where the fibers end in a direction perpendicular to the edge. At the inner short side is the tab connected to the flexfoil 1. The cut-outs 7, 9 are preferably made by removing some flexfoil material as narrow U-shaped or straight strips. The tabs 11, 13 can be bent from the plane of the flexfoil 1, provided that the plastics sheets of the flexfoil are flexible and the lamination is made appropriately and the tabs have a sufficient length in order not to damage the optical fibers and not to cause non-desired attenuation therein. At the tab ends some conventional optical connector means 15 can be attached for forming suitable optical interfaces for the optical fibers ending at the tab end, such as MT-connectors. Electrooptical modules 17 attached to the circuit board 5 can thus be connected to the fibers of an internal tab 11. An edge tab 13 can be connected to an optical backplane connector 19 attached to the circuit board 5 at an edge thereof which is to be connected to a backplane. In the case where such a backplane connector 19 is located at some distance from the edge of the circuit board a cut-out 7' having a narrow remaining strip 20 at the edge of the flexfoil 1 can also be used, as is illustrated in the right nearby corner of the flexfoil of FIG. 1. In order to make such connections the tabs 11, 13 have to bent to an S-shape, the end portions of the S being located in parallel planes at a small distance of each other.

Figure 2:
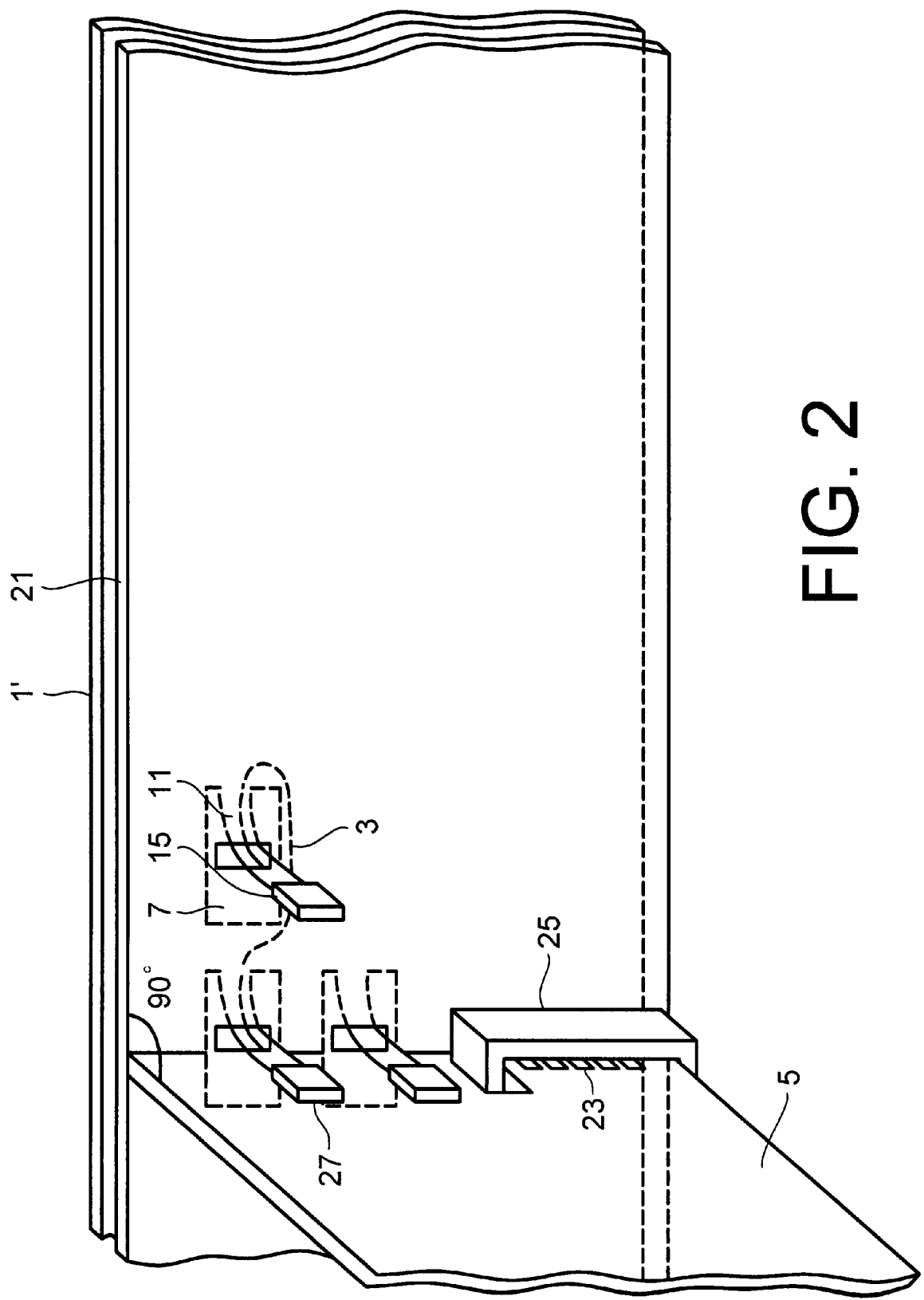
FIG. 2 is a schematic perspective view of an electrical backplane having an optical flexfoil mounted behind it.

In the perspective view of FIG. 2 a flexfoil 1' is shown to be located closely behind an electrical backplane 21, the flexfoil acting as an optical, supplementary backplane. Printed circuit boards 5 extend perpendicularly from the front surface of the backplane 21 and are connected thereto through cooperating conventional electrical edge contacts 23 and backplane connector strips 25. FIG. 3 shows in a sectional view the same components as FIG. 2 but here also an optical flexfoil 1 is located at a surface of the board 5 in the same way as illustrated in FIG. 1, the board carrying electrical and optical components 24 and an electooptical device being shown at 17. The printed circuit boards 5 have optical connectors 27 at their rear edges, compare the optical connector 19 of FIG. 1. At the connector strips 25 or in positions located along lines near and parallel with the longitudinal vertical axes of the strips 25 at places corresponding to the optical connectors 27 on the printed circuit boards 5 rectangular through-holes 29 are made in the electrical backplane 21 for allowing tabs 11 of the flexfoil 1 to project therethrough to be connected to optical connectors 30 attached to the front side of the backplane 21, the tabs being bent to have their end portions located perpendicularly to the main body of the flexfoil 1 and to the backplane 21 to be inserted in the rear end of the optical connectors 30. The optical connectors 30 on the electrical backplane are placed so that the corresponding optical connectors 27 will fit therein when the circuit boards 5 are being attached to the backplane.

Since the flexfoil as described having connector tabs not extending beyond the basic, rectangular shape of the flexfoil, it can be easily handled without risk of damaging the tabs. Thus, as is illustrated in FIG. 4, it can for polishing be mounted by its circumference in an X-Y-translation table 31 of a positioning machine indicated at 33. It is repeatedly positioned, tab by tab, so that at each time a tab 11 is placed immediately below a connector holder 35 attached to a stationary arm 37 of the machine 33. The connector holder 35 is provided with means for bending the tab to have its end region located in a predetermined oblique angle, e.g. perpendicularly, to the flexfoil 1 and to the table 31, as illustrated in the figure in hem downward direction. A stationary polishing device indicated at 39 having a rotating polishing wheel 41 is located beneath the X-Y-table 31 and will then polish the fiber ends at the end edge of a tab 11, when it is bent by the connector holder 35. The rotation axis of the polishing wheel can be perpendicular to the flexfoil main body and the table 31 but equally well it can be located in an oblique angle thereto, for example about 45°. The connector holder 35 will always bend a tab 11 to be polished so that its end region is parallel to the rotation axis or forms some small, predetermined angle thereto.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A method of making a connection means for optical waveguides of an optical flexfoil, comprising steps of:
    producing waveguides of the optical flexfoil in such a way that at least one waveguide has a first portion, at which an optical connection to an external device for transferring light from or to the optical waveguide of the optical flexfoil is to be made and which is located at an inner position of a surface of the optical flexfoil, the inner position being located at a distance from edges of the optical flexfoil, and
    making a U-shaped cutout in the optical flexfoil at sides of the first portion leaving an area of the optical flexfoil to support the first portion to form a tab the U-shaped cutout being surrounded at all sides by material of the flexfoil, so that the first portion and an area of the optical flexfoil supporting the first portion can be bent or flexed laterally from a plane of regions of the optical directly surrounding the area.

2. The method of claim 1, wherein
    when producing the optical waveguides the first portion is located at an edge of the optical flexfoil, and
    the cut-outs are made to have the shape of strips extending perpendicularly from the edge of the optical flexoil.

3. An optical flexfoil comprising at least one optical waveguide having a first portion, at which an optical connection is to be made to an external device for transferring light from or to the optical waveguide of the optical flexfoil and which is located at an inner position of a surface of the optical flexfoil, the inner position being located at a distance from the edges of the optical flexfoil, the optical flexfoil comprising a U-shaped cutout at sides of the first portion of the optical waveguide, the U-shaped cut-out being surrounded at all sides by material of the flexfoil and leaving an area of the flexfoil to support the first portion to form a tab, so that the first portion and the area supporting the first portion can be bent from a plane of regions of the flexfoil directly surrounding the area.

4. The optical flexfoil of claim 3, wherein
    the first portion is located at an edge of the optical flexfoil, and
    the cut-outs have the shape of strips extending perpendicularly from the edge of the optical flexfoil.

5. A backplane assembly for electrically and optically connecting a multitude of circuit boards, the backplane assembly comprising an electrical backplane having at a first surface electrical connectors for circuit boards to be connected to the backplane assembly and further comprising and optical flexfoil separate from the electrical backplane, the optical flexfoil being located at a distance from and extending in parallel with a second surface of electrical backplane, the second surface being opposite to the first surface, the electrical backplane having through-holes for allowing tabs of the optical flexfoil having optical waveguides coupled to optical connectors to pass through the through-holes.

6. A method of making an optical flexfoil, comprising the steps of:
    producing a optical flexfoil comprising at least one optical waveguide and at least one flexible connector tab, so that an end of the at least one optical waveguide is located at the end of the at least one flexible connector tab, at which an optical connection is to be made from the at least one optical waveguide to an external device for transferring light from or to the at least one optical waveguide, and so that the at least one flexible connector tab can be bent from a plane of a main body of the optical flexfoil,
    bending the at least one flexible connector tab to have an end region of the at least one flexible connector tab located in a predetermined angle to said plane,
    polishing an end surface of the at least one optical waveguide ending at the end of the bent at least one flexible connector tab, and
    letting the bent, at least one flexible connector tab relax to an original position in the plane of the main body of the optical flexfoil.

7. The method of claim 6, wherein in bending the at least one flexible connector tab the end region of the at least one flexible connector tab is made to be located perpendicularly to said plane.

8. The method of claim 6, comprising the additional step of attaching, before the step of polishing, an optical connector to the end of the at least one flexible connector tab.

* * * * *